July 16, 1957
E. E. ALCORN
2,799,319
MACHINE FOR RECONDITIONING BAKERY PANS
Filed Jan. 19, 1953
2 Sheets-Sheet 1
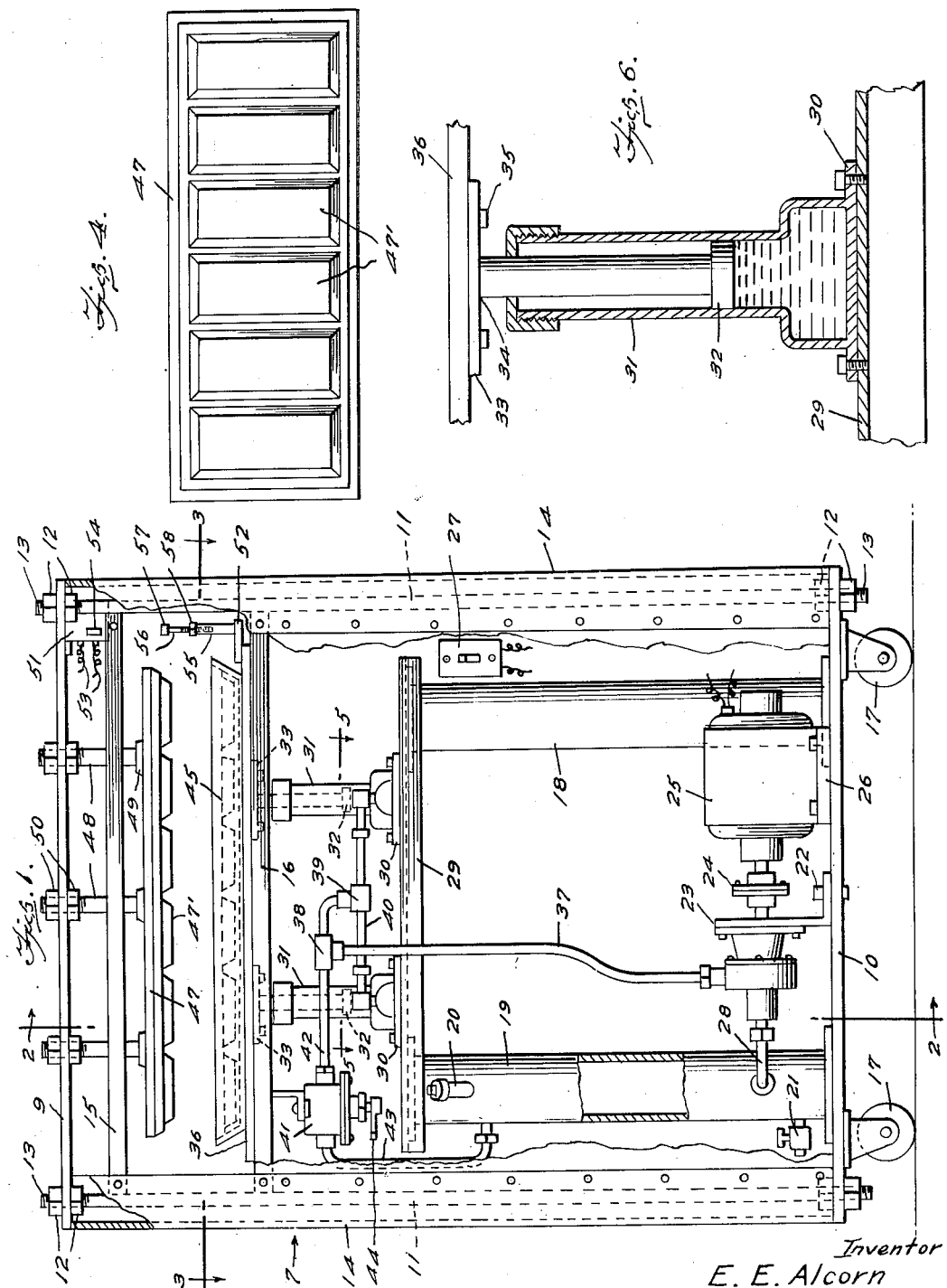
Inventor
E. E. Alcorn
By Bernard F. Garvey
ATTY.

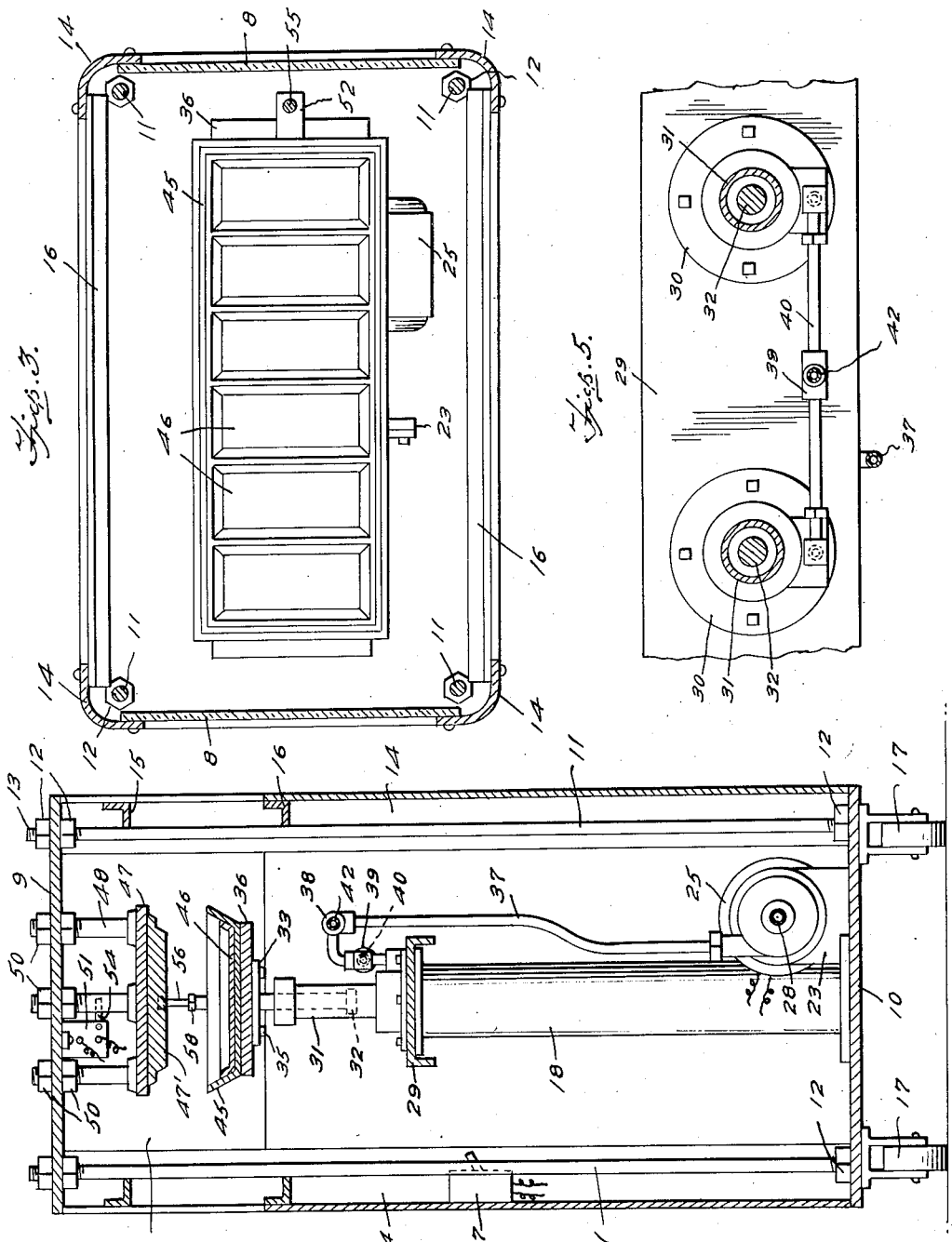

2,799,319

MACHINE FOR RECONDITIONING BAKERY PANS

Estes E. Alcorn, Phoenix, Ariz., assignor of one-fourth to Lloyd E. Eisele and one-fourth to Monroe L. Strickler, Phoenix, Ariz.

Application January 19, 1953, Serial No. 331,817

1 Claim. (Cl. 153—48)

The present invention relates to bakery pans and more particularly to a machine for reshaping sheet metal bakery pans which have become distorted in the course of use.

In bakeries, the sheet metal pans used for baking bread, buns, rolls, etc. very often become distorted due to the intense heat and rough handling to which they are subjected. This renders the pans unusable for baking purposes and necessitates repair or replacement. Replacement is very costly and no mechanical apparatus for reshaping of bakery pans has been found practical, and repair by hand obviously requires the expenditure of too much time and energy to be worthwhile from an economic standpoint. It is therefore the principal object of the present invention to provide a machine for reshaping distorted sheet metal bakery pans, in multiple, which is readily adaptable for reshaping pans of the various sizes and shapes employed in a bakery.

A further object of the present invention is to provide a machine for reshaping distorted sheet metal pans by application of pressure to the pans, the amount of pressure exerted on the pans being predetermined and automatically regulated.

With a machine made in accordance with the teaching of this invention, I have found it possible to reshape seven hundred and twenty pans an hour, the size of the machine, approximately four feet high three and a half feet long and two feet wide, permitting convenient operation even in a corner of a small room.

Other objects will be apparent from the following description of the present invention, taken in connection with the appended drawings, wherein:

Fig. 1 is a front elevational view of the device of the present invention, portions thereof being broken away to disclose details of structure;

Fig. 2 is a longitudinal sectional view taken along the line 2—2 of Fig. 1 looking in the direction of the arrows;

Fig. 3 is a sectional view taken along the line 3—3 of Fig. 1 looking in the direction of the arrows;

Fig. 4 is a plan view of the upper or inside die member which forms a part of the present invention;

Fig. 5 is a sectional view taken along the line 5—5 of Fig. 1 looking in the direction of the arrows, and Fig. 6 is a view partly in section and partly in elevation of a power cylinder forming a part of the present invention.

Referring now in greater detail to the drawings, the present invention comprises a cabinet generally designated 7 having wall panels 8, a top plate 9 and a bottom plate 10. Plates 9 and 10 are held in predetermined spaced relation by shafts 11, one located at each corner of the cabinet, and nuts 12. The nuts are adjustably mounted on threads 13 above and below the plates 9 and 10 as illustrated to advantage in Fig. 1. Secured to top plate 9, wall panels 8 and bottom plate 10 are vertically extending sheet metal corner sections 14 which have horizontal brace members 15 and 16 affixed thereto. The cabinet thus constructed forms a rigid frame to support the fixedly positioned parts of the mechanism presently to be described.

Secured to the underside of bottom plate 10 are casters 17 to facilitate movement of the machine. Fixedly mounted on the bottom plate 10 of cabinet 7 are a pair of vertical tubular uprights 18 and 19, the latter of which functions also as an oil reservoir. Upright 19 is provided with a filler opening and plug 20 at the top and with a drain cock 21 at the bottom to permit filling and emptying the reservoir when desired. These cylinders 18 and 19 are axially spaced widely and are located adjacent the ends of the cabinet.

Secured to the bottom plate 10 of cabinet 7, by means 22, is a conventional type oil pump 23 driven through a coupling 24 by a motor 25 which is engaged to bottom plate 10 as indicated at 26. Motor 25 is controlled by a switch 27 in an obvious manner. Communication between oil pump 23 and oil reservoir 19 is effected by pipe 28.

Mounted atop uprights 18 and 19 is a shelf 29 to which is secured at 30 power cylinders 31, each having a piston 32 operating therein. The cylinders 21 are in axial alignment with the uprights 18 and 19 and are also widely spaced so that the pistons 32 support the shelf 29 adjacent its ends. As shown to advantage in Fig. 6, a plate 33 is welded, as at 34, or secured in any other suitable manner, to the upper end of each piston 32. Cap screws 35 secure plates 33 to a support member 36, the latter thereby being movable in response to the activation of power cylinders 31.

Oil from the reservoir 19 is fed from oil pump 23 through pipe 37 to T coupling 38, one end of which latter communicates with power cylinders 31 through coupling 39 and manifold 40. When pressure is applied to the power cylinders it is equalized so that the two ends of the plate 33 are urged to move upwardly with equal force. The opposite end of the T coupling communicates with a two-way valve 41 through pipe 42. A return pipe 43 extends from the valve 41 to the oil reservoir 19. The valve is controlled by a hand lever 44 operable from outside of the cabinet. Valve 41 is pendently supported from a fixed part of the cabinet as shown in Fig. 1. When control valve 41 is closed by hand lever 44, and the pump operating, oil is forced under pressure to cylinders 31 thereby urging pistons 32 upwardly in their respective cylinders to correspondingly elevate the support 36. When the valve is open the manifold 40 remains filled and the oil forced by gravitation of the support 36 through return pipe 43 into the reservoir 19.

Permanently affixed to support member 36 is a die frame 45 fabricated to the depth and width of the pans. A lower or outside die 46 is detachably mounted in the frame 45, the die 46 having multiple cavities for the reception of a plurality of pans. The die 46 may be quickly replaced by a different die to accommodate pans of different shapes.

An upper or inside die frame 47 is rigidly suspended from top plate 9 of cabinet 7 by bolts 48 permanently affixed to the die as shown at 49. The bolts are threaded for a considerable portion of their length and are held to the top plate 9 by nuts 50 which engage both faces of the top. Replacement of the die frame 47 is readily effected by removal of the upper set of nuts 50. By proper adjustment of the nuts 50 the frame 47 is positioned in parallelism with the support member 36. The inside dies designated 47', are molded to the size and shape of the lower dies 46.

When power cylinders 31 are activated, lower or outside die frame 45 is urged upwardly into engagement with inside die frame 47 exerting pressure on the pans in an upward direction to better control the pressure. The dies 46 are spaced evenly longitudinally of the holder 45 and the dies 47' are spaced in the same manner on the support 47. This arrangement of die spacing combined with the parallelism of the members 36 and 47 and with the fact that, in operation, both ends of the member 36 are urged upward by equal forces insures that all of the deformed pans held between the sets of dies will be equally reformed. It is essential that the amount of pressure be accurate to properly recondition the pans and to further this end I employ a pressure limiting system comprising a switch 51 and a tripper 52.

Limit switch 51 is fixedly secured to top plate 9 and is electrically connected to motor 23 by wiring 53. A switch element 54 is disposed in the path of movable tripper 52. Tripper 52 comprises a holder 55 secured to the die frame 45 with a stud 56 screwed into the holder, the upper end of said stud being enlarged to form a contact 57 for tripping switch element 54. A jam nut 58 is mounted on the stud and is engageable with the top of holder 55 for holding the stud in place. Stud 56 is removed by loosening jam nut 58 and unscrewing the stud from holder 55. Studs of different length are employed, the particular stud used depending on the type and depth of pans being reconditioned.

In operation, the distorted pans are first placed in the lower die frame 45. Switch 27 is then thrown to start motor 25 which in turn actuates oil pump 23 through coupling 24 to pump oil from reservoir 19 up supply pipe 37 to coupling 38. Since the manifold 40 normally is filled, the oil flows through pipe 42, valve 41 and return pipe 43 to the oil reservoir 19. When valve 41 is closed by hand control lever 44, pistons 32 of power cylinders 31 are urged upward by the oil pressure. Lower die frame 45 moves upwardly into engagement with upper die frame 47. Increasing pressure is exerted on the pan until contact 57 of the tripper 52 throws switch element 54 of the limit switch 51 at which time the motor is shut off, thereby deactivating the oil pump. The return of hand control lever 44 to its starting position opens valve 41 and the oil is returned to oil reservoir 19 through return pipe 43. Lower die frame 45 is simultaneously lowered to its initial position.

Since the speed with which the pans can be reshaped is an important factor to be considered in evaluating the usefulness of a device of this nature, it should be noted that each operation of the machine requires only 5 seconds. Thus hundreds of pans of a particular size and shape can be reconditioned in an hour's time, the precise number, of course, being dependent, in part, upon the skill of the operator in inserting and removing the pans.

While I have shown and described the present invention as applied to bakery pans, it will, of course, be understood that such has been done for purposes of illustration only and not by way of limitation, and therefore, only such limitations are to be imposed thereon as may reasonably come within the scope of the appended claim.

What I claim is:

In a machine for restoring groups of distorted bakery pans to original form, a frame having rigidly connected top and bottom members, an elongated upper mold support dependently carried by said top member, a series of uniformly spaced pan molds affixed to the underside of the upper mold support, a lower mold support, a second series of pan molds spaced uniformly to, and coacting with the first series of molds, and a hydraulic pressure system supported on the lower frame member and supporting both ends of the lower mold support and acting to urge both ends upwardly with uniform force, the pressure system including a pair of vertical tubular uprights supported on the bottom frame member and spaced to lie beneath the lower mold support adjacent the ends thereof, one of said uprights constituting a fluid reservoir, a pair of hydraulic cylinders fixedly supported from said tubular supports in axial alignment therewith, pistons in said cylinders, engaging said lower mold support, a tubular manifold connecting the hydraulic cylinders, a three-way valve one side of which has pipe connection to the upper part of said reservoir, the other side of the valve having pipe connection to the manifold intermediate its ends, the pressure system further including a pump having its intake connected to the reservoir and its output pipe connected to the last mentioned pipe connection from the valves.

References Cited in the file of this patent

UNITED STATES PATENTS

| | | |
|---|---|---|
| 203,331 | Everson | May 7, 1878 |
| 848,688 | Rieseck | Apr. 2, 1907 |
| 1,154,970 | Burnham | Sept. 28, 1915 |
| 1,255,237 | Sevigne | Feb. 5, 1918 |
| 1,522,149 | Sindelar | Jan. 6, 1925 |
| 2,058,377 | Francis | Oct. 20, 1933 |
| 1,960,000 | Chesney | May 22, 1934 |
| 2,031,345 | Tinkham | Feb. 18, 1936 |
| 2,113,110 | Ernst et al. | Apr. 5, 1938 |
| 2,186,288 | Gallagher | Jan. 9, 1940 |
| 2,299,845 | Pawloski | Oct. 27, 1942 |
| 2,347,102 | Hartmann | Apr. 18, 1944 |
| 2,410,694 | Tyler | Nov. 5, 1946 |
| 2,475,830 | Fink | July 12, 1949 |
| 2,481,862 | Muller | Sept. 13, 1949 |
| 2,669,914 | Swaine | Feb. 23, 1954 |